United States Patent
Jin et al.

(10) Patent No.: US 8,059,744 B2
(45) Date of Patent: Nov. 15, 2011

(54) FREQUENCY BAND EXTRAPOLATION BEAMFORMING WEIGHT COMPUTATION FOR WIRELESS COMMUNICATIONS

(75) Inventors: Hang Jin, Plano, TX (US); Yanxin Na, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 846 days.

(21) Appl. No.: 12/109,394

(22) Filed: Apr. 25, 2008

(65) Prior Publication Data
US 2009/0270118 A1    Oct. 29, 2009

(51) Int. Cl.
  *H04B 7/02* (2006.01)
(52) U.S. Cl. ....................................................... 375/267
(58) Field of Classification Search ................... 375/267, 375/347, 299
See application file for complete search history.

(56) References Cited

U.S. PATENT DOCUMENTS

| 6,006,110 A | * | 12/1999 | Raleigh | 455/561 |
| 2007/0207730 A1 | * | 9/2007 | Nguyen et al. | 455/39 |
| 2007/0249296 A1 | * | 10/2007 | Howard et al. | 455/101 |

* cited by examiner

Primary Examiner — Kevin Kim
(74) Attorney, Agent, or Firm — Edell, Shapiro & Finnan, LLC

(57) ABSTRACT

Techniques are provided to facilitate the computation of beamforming weights used by a first communication device when sending a transmission via a plurality of antennas to a second communication device where knowledge of the behavior of the channel between the first communication device and the second communication device is limited to a portion of a wide frequency band. A frequency extrapolation beamforming weight computation process is provided to derive knowledge in other frequency subbands based on information contained in the received transmission from the second communication device.

30 Claims, 5 Drawing Sheets

FREQUENCY BAND EXTRAPOLATION BEAMFORMING WEIGHT COMPUTATION FOR WIRELESS COMMUNICATIONS

BACKGROUND

In a wideband wireless communication systems the bandwidth of a transmission is usually is much larger than the coherent frequency bandwidth. This implies that the channel signatures in different frequency subbands may be mutually uncorrelated. When a first communication device, such as a base station, does not have information pertaining to the channel signature in all frequency subbands, the use of beamforming techniques at the first communication device when transmitting to a second communication device, e.g., a specific or particular mobile station, becomes less reliable. To feedback all estimated channel coefficients in all frequency subbands would require too much overhead in a transmission from the second communication device to the first communication device. The term "uplink" is used herein to refer to transmissions from the second communication device to the first communication device and the term "downlink" is used to refer to transmissions from the first communication device to the second communication device.

In time division duplex (TDD) systems, the uplink channel coefficients matrix is strongly correlated with the downlink channel coefficients matrix. Thus, there is an opportunity to exploit this property in order to derive knowledge about the channel between the first communication device and the second communication device in any frequency subband.

DETAILED DESCRIPTION

Overview

Techniques are provided to facilitate the computation of beamforming weights used by a first communication device when sending a transmission via a plurality of antennas to a second communication device where knowledge of the behavior of the channel between the first communication device and the second communication device is limited to a portion of a wide frequency band. A frequency extrapolation beamforming weight computation process is provided to derive knowledge in other frequency subbands based on information contained in the received transmission from the second communication device. The first communication device, e.g., a base station (BS) receives a transmission at its plurality of antennas from a second communication device, e.g., a mobile station (MS). The transmission uses some but not all frequency subbands within a frequency band space. The first communication device recovers the baseband signals carried in the frequency subbands in the received transmission. A channel covariance matrix is computed from the baseband signals in the frequency subbands with respect to the plurality of antennas of the first communication device. Next, uplink beamforming weights are computed from the baseband signals in the frequency subband from the channel covariance matrix. A spatial projection of the uplink beamforming weights is then computed to determine direction of arrival information. A downlink spatial projection for a given frequency subband is computed from the spatial projection of the uplink beamforming weights. Finally, downlink beamforming weights are computed from the downlink spatial projection. The downlink beamforming weights are for use by the first communication device when beamforming a downlink transmission via the plurality of antennas of the first communication device to the second communication device. According to a further variation, frequency domain variations in the channel between the first communication device and the second communication device are derived based on difference in time of arrival of signals from different direction of arrivals at the plurality of antennas of the first communication device. The downlink spatial projection for a given frequency subband is computed from the spatial projection of the uplink beamforming weights and the frequency domain variations.

Figure 1:
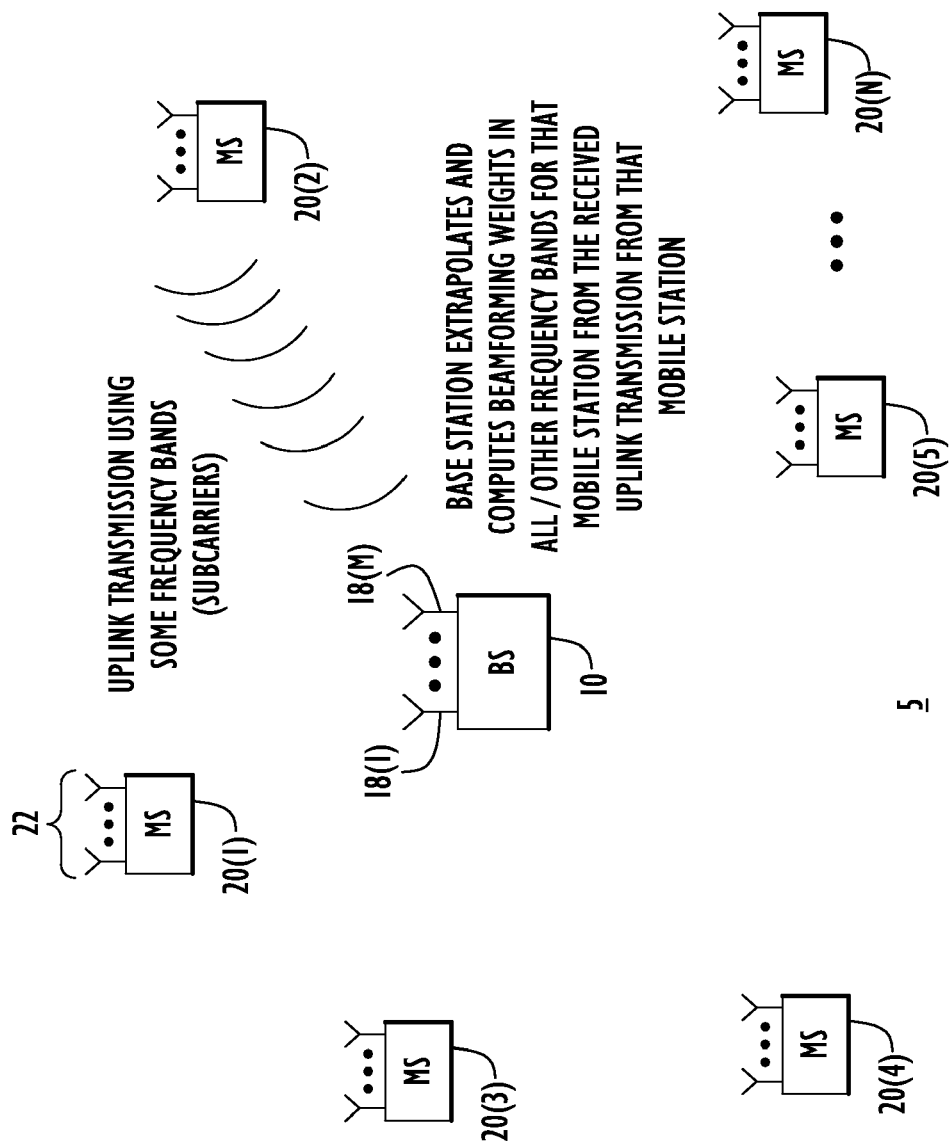
FIG. 1 is an example of a block diagram of a wireless communication system in which a base station beamforms messages to mobile stations using a wideband communication protocol.

Referring first to FIG. 1, a wireless radio communication system or network is shown generally at reference numeral 5 and comprises a first communication device, e.g., a BS 10, and a plurality of second communication devices, e.g., MS's 20(1)-20(N). The BS 10 may connect to other wired data network facilities (not shown) and in that sense serve as a gateway or access point through which the MS's 20(1)-20(N) have access to those data network facilities.

The BS 10 comprises a plurality of antennas 18(1)-18(m) and the MS's 20(1)-20(N) may also comprise a plurality of antennas 22. Thus, the wireless link between the base station 10 and any given mobile station is a multiple-input multiple-output (MIMO) wireless link that allows the base station 10 to using beamforming weights dedicated to a particular mobile station when transmitting a message intended for that particular mobile station. The plurality of antennas 18(1)-18(m) on the BS 10 may be considered an antenna array as may the plurality of antennas 22 on the MS's 20(1)-20(N).

When the BS 10 sends a transmission to a particular mobile station, e.g., MS 20(2), it applies beamforming weights to the message to be transmitted via the plurality of antennas 18(1)-18(m) to the MS 20(2). The term "beamform" as used herein means that the signals received by a communication device on its multiple antennas from another device are coherently combined, and the signals transmitted from multiple antennas of a communication device are weighted in both phase and magnitude so that they will be coherently combined at the intended destination communication device.

The BS 10 may wirelessly communicate with individual ones of the MS's 20(1)-20(N) using a wideband wireless communication protocol in which the bandwidth is much larger than the coherent frequency bandwidth. Consequently, the channel signatures in different frequency bands may be mutually uncorrelated and this makes for use of beamforming weights to a particular MS less reliable since each MS uses only part of the wideband when transmitting to the BS 10.

Techniques are provided herein to compute the beamforming weights for all frequency bands by extrapolating from knowledge gained for beamforming weights in some of the frequency bands. The following description downlink beamforming weights in time division duplex (TDD) orthogonal frequency division multiple access (OFDMA) system, and is meant only by way of example. These techniques may be used to generate beamforming weights in any system with frequency mismatch.

These techniques involve low complexity that can significantly improve the process of downlink beamforming in macrocell/microcell TDD systems even in the presence of multipath fading conditions. For example, first we estimate instantaneous channel covariance with pilot and data in a few bands, such as from an uplink signals transmitted according to the IEEE 802.16-2005 (or 2007) communication standard known under the commercial brand WiMAX™, when the partial usage of subchannels (PUSC) mode is used transmission. The instantaneous beamforming weights associated with reception of an uplink transmission are computed and the projection of the beamforming weights is then computed in the received tiles, from which the downlink beamforming weights are computed for any other bands. To reiterate, the techniques described herein are applicable to the process of setting downlink beamforming weights in any system with frequency mismatch, such as in TDD code division multiple access (CDMA) systems, and as mentioned above, TDD OFDMA systems.

Figure 2:
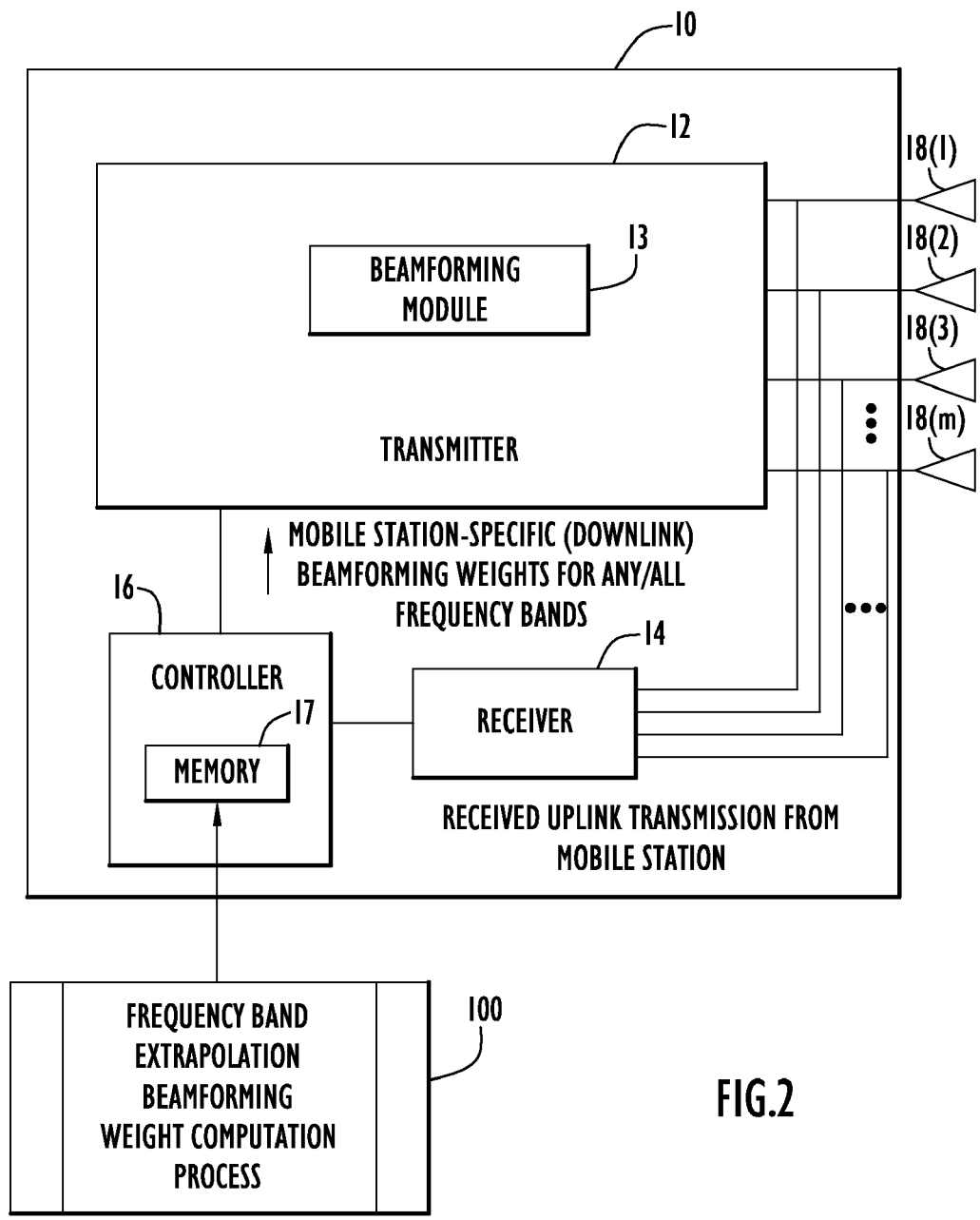
FIG. 2 is an example of a block diagram of a base station that is configured to compute downlink beamforming weights using frequency extrapolation techniques.

Turning to FIG. 2, an example of a block diagram of the base station 10 is described. The base station 10 comprises the plurality of antennas 18(1)-18(m), a transmitter 12, a receiver 14 and a controller 16. The controller 16 supplies the data to the transmitter 12 to be transmitted and processes signals received by the receiver 14. In addition, the controller 16 performs other transmit and receive control functionality. Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

The transmitter 12 may comprise individual transmitter circuits that supply respective upconverted signals to corresponding ones of the antennas 18(1)-18(M) for transmission. The receiver 14 receives the signals detected by each of the antennas 18(1)-18(M) and supplies corresponding antenna-specific receive signals to controller 16. It is understood that the receiver 14 may comprise a plurality of receiver circuits, each for a corresponding one of the antennas 18(1)-18(M). For simplicity, these individual receiver circuits and individual transmitter circuits are not shown. There is a beamforming module 13 that may reside within or separate from the transmitter 12. The beamforming module 13 comprises logic that applies beamforming antenna weights to a signal to be transmitted (hereinafter called a "transmit signal") in order to generate a corresponding ones of a plurality of weighted signals that are supplied to respective ones of the plurality of antennas 18(1)-18(M).

The controller 16 comprises a memory 17 or other data storage block that stores data used for the techniques described herein. The memory 17 may be separate or part of the controller 16.

The beamforming module 13 and controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). To this end, logic is provided in any of these forms to execute a frequency band extrapolation beamforming weight computation process shown at 100. The process 100 is described in more detail hereinafter in conjunction with FIG. 6. In one example shown in FIG. 1, the logic for the process 100 may comprise processor readable instructions that are stored in the memory 17, or it may be embodied by any of the other aforementioned types of logic. Furthermore, while FIG. 2 shows that the controller 16 is configured to compute the beamforming weights, this is not meant to be limiting. For example, the logic to perform these computations may be implemented in a controller or block that is local and dedicated to the transmitter 12, and separate from the controller 16.

Description of the frequency band extrapolation beamforming weight computation process 100 is described in connection with a TDD-OFDMA system, such as that used in a WiMAX™ communication system. OFDM exploits the frequency diversity of the multipath channel by coding and interleaving the information across the subcarriers prior to transmissions. In an OFDM system, information related to a transmission is available in the time domain by means of OFDM symbols and in the frequency domain by means of subcarriers. The time and frequency resources can be organized into sub-channels for allocation to individual users. OFDMA is a multiple-access/multiplexing scheme that provides multiplexing operation of data streams for multiple users onto the downlink sub-channels and uplink multiple-access by means of uplink sub-channels.

Figure 3:
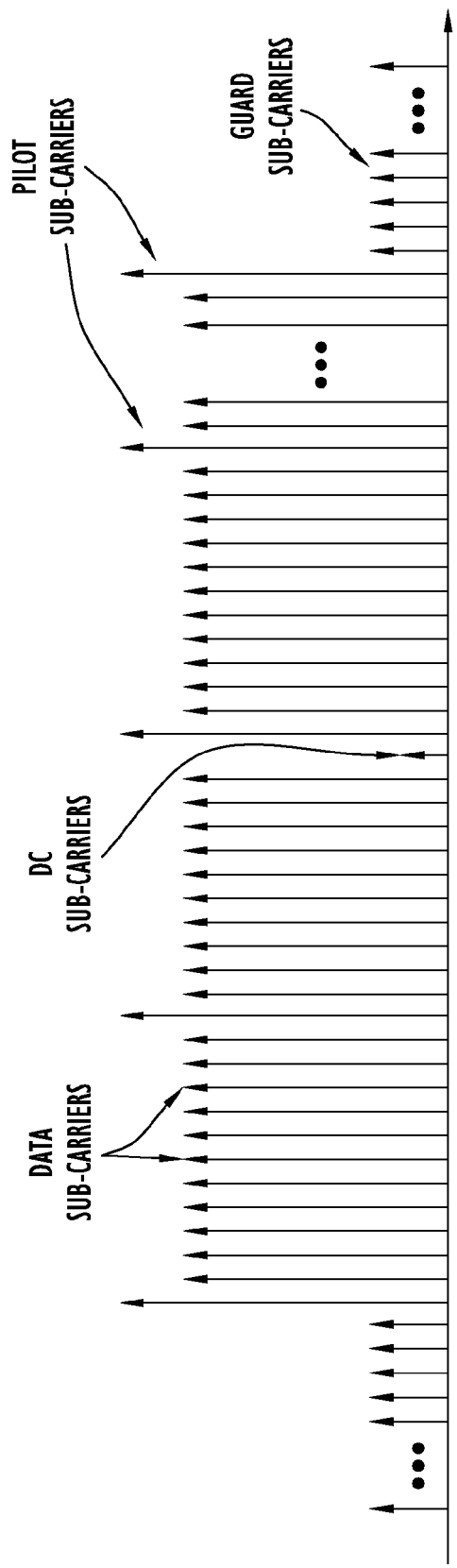
FIG. 3 is a diagram illustrating an example of the subcarrier organization of a symbol in an orthogonal frequency division multiple access (OFDMA) system.

Turning to FIG. 3, a diagram is shown illustrating an example of a structure of an OFDMA symbol. The OFDMA symbol structure comprises three types of subcarriers as shown in FIG. 3: data subcarriers for data transmission, pilot subcarriers for estimation and synchronization purposes, and null subcarriers for no transmission but used as guard bands and for DC carriers. Active (data and pilot) subcarriers are grouped into subsets of subcarriers called subchannels for use in both the uplink and downlink. For example, in a WiMAX™ system, the minimum frequency-time resource unit of sub-channelization is one slot, which is equal to 48 data tones (subcarriers).

Figure 4:
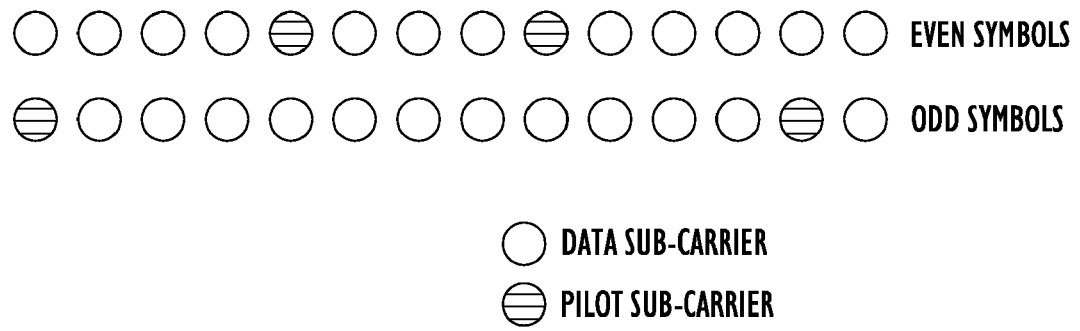
FIG. 4 is diagram illustrating an example of cluster grouping of subcarriers in one type of OFDMA system.

Furthermore, in a WiMAX system there are two types of subcarrier permutations for sub-channelization; diversity and contiguous. The diversity permutation allocates subcarriers pseudo-randomly to form a sub-channel, and in so doing provides for frequency diversity and inter-cell interference averaging. The diversity permutations comprise a fully used subcarrier (FUSC) mode for the downlink and a partially used subcarrier (PUSC) mode for the downlink and the uplink. In the downlink PUSC mode, for each pair of OFDM symbols, the available or usable subcarriers are grouped into "clusters" containing 14 contiguous subcarriers per symbol period, with pilot and data allocations in each cluster in the even and odd symbols as shown in FIG. 4.

A re-arranging scheme is used to form groups of clusters such that each group is made up of clusters that are distributed throughout a wide frequency band space spanned by a plurality of subcarriers. The term "frequency band space" refers to the available frequency subcarriers that span a relatively wide frequency band in which the OFMDA techniques are used. When the FFT size L=128, a sub-channel in a group contains two (2) clusters and is made up of 48 data subcarriers and eight (8) pilot subcarriers. When the FFT size L=512, a downlink PUSC sub-channel in a major group contains some data subcarriers in ten (10) clusters and is made up of 48 data subcarriers and can use eight (8) pilot subcarriers.

The data subcarriers in each group are further permutated to generate subchannels within the group. Therefore, only the pilot positions in the cluster are shown in FIG. 4. The data subcarriers in the cluster are distributed to multiple subchannels.

Figure 5:
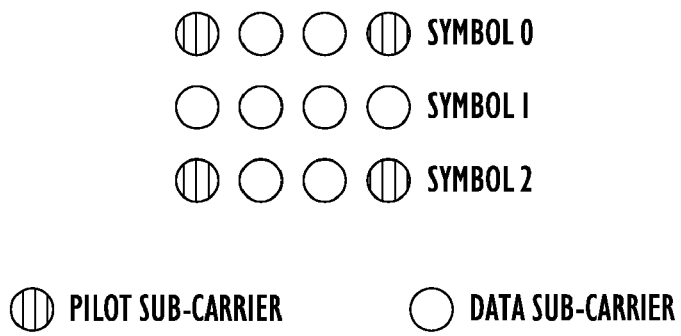
FIG. 5 is a diagram illustrating a tile structure used in one mode of one type of OFDMA system.

Analogous to the cluster structure for a downlink transmission, a "tile" structure is defined for the uplink PUSC mode whose format is shown in FIG. 5. The available subcarriers in the frequency band space is split into tiles and six (6) tiles, chosen from across the entire spectrum by means of a re-arranging/permutation scheme, are grouped together to form a slot. The slot comprises 48 data subcarriers and 24 pilot subcarriers in 3 OFDM symbols. In other words, a tile is a group of data subcarriers dispersed throughout a frequency band space together with pilot subcarriers, across 3 OFDM symbols.

The foregoing description of one example of a TDD OFMDA system with respect to FIGS. 4 and 5 is provided by way of background for the description of the process 100 described hereinafter. In particular, process 100 described hereinafter involves estimating an uplink channel covariance matrix in some PUSC subchannels to generate downlink beamforming weights in a TDD OFDMA system.

Figure 6:
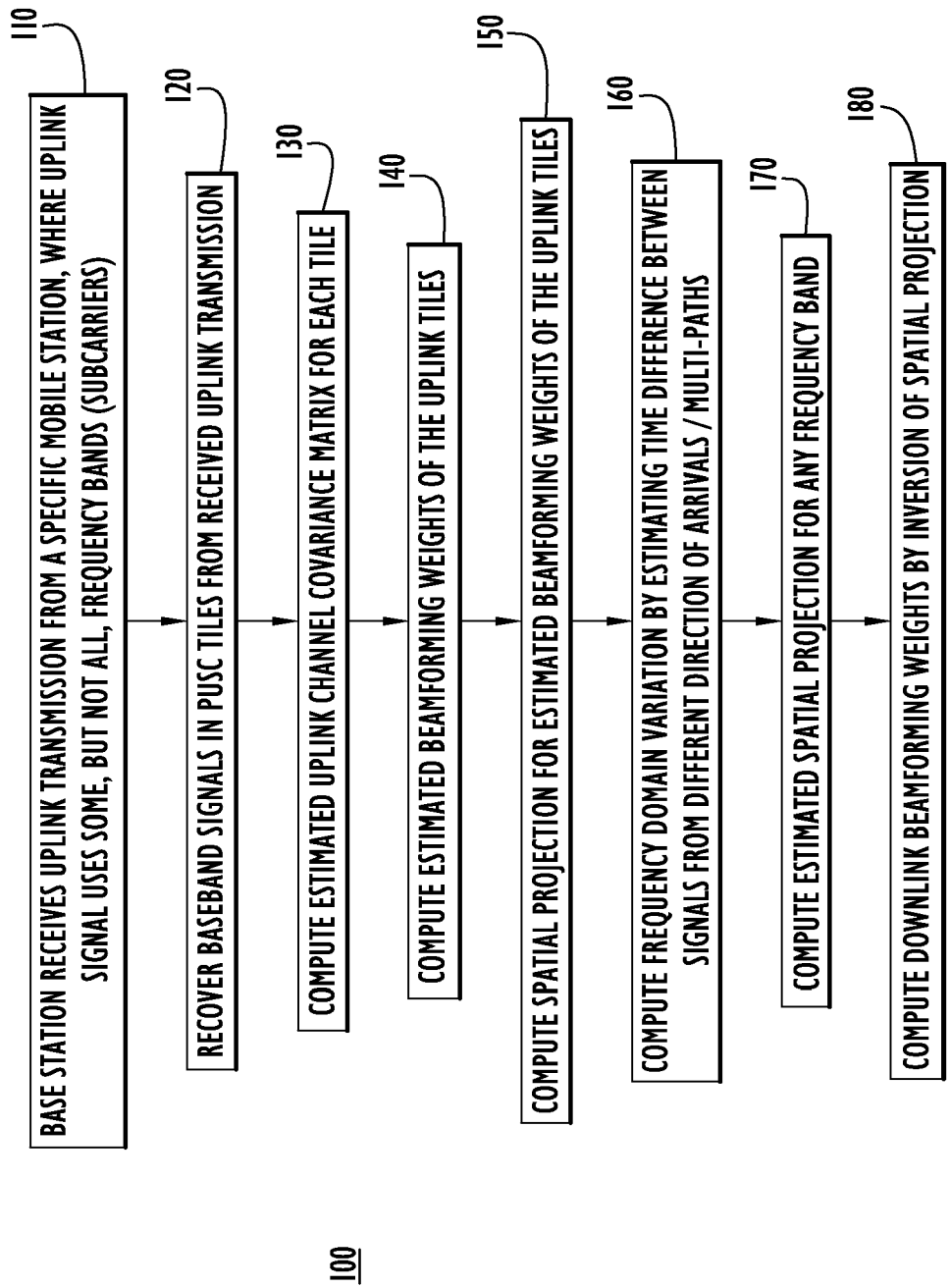
FIG. 6 is an example of a flow chart for a frequency band extrapolation beamforming weight computation process.

With reference to FIG. 6, the process frequency band extrapolation beamforming weight computation process 100 is now described. At 110, the BS 10 receives an uplink transmission from a specific MS. The uplink transmission uses some, but not all frequency bands (subcarriers) available in the OFDMA symbol space, which is inherently the case when a MS transmits using the PUSC mode. For example, referring back to FIG. 5 the specific MS may be assigned to several uplink subchannels. There are 6 PUSC tiles in one subchannel, and in one PUSC tile, there are 12 signals that transmit 4 pilot signals or 8 data signals. The process 100 uses all 12 signals to estimate an uplink channel covariance matrix for one PUSC tile. At 120, the baseband signals for the received PUSC tiles are recovered from the received uplink transmission.

At 130, the uplink channel covariance matrix $R_i$ is estimated for each uplink tile. The instantaneous uplink channel covariance matrix $R_i$ in the frequency domain for the specific MS is defined as a group of matrices $\{R_{i_n}\}_{n=1}^J$, where J is the number of tiles, and $i_1, i_2, \ldots, i_J$ are the indices of received signals' subcarriers in J tiles respectively. One index of subcarriers in the nth received PUSC tile may be $i_n$. Let size of FFT, the maximum number of subcarriers, be L, $1 \leq i_1 < i_2 < \ldots < i_J \leq L$. For example, in an uplink PUSC tile, $S_{j,q}(m)$ for $1 \leq m \leq M$ denotes the received frequency domain signals on the jth subcarrier, the qth symbol, and mth antenna of the BS 10, where M is the number of antennas (18(1)-18(m)) at the BS 10. The instantaneous channel covariance matrix $R_{i_n}$ is computed as $$R_{i_n} = \frac{1}{12} \sum_j \sum_q \begin{bmatrix} S_{j,q}(1) \\ S_{j,q}(2) \\ \vdots \\ S_{j,q}(M) \end{bmatrix} \begin{bmatrix} S_{j,q}(1) \\ S_{j,q}(2) \\ \vdots \\ S_{j,q}(M) \end{bmatrix}^H$$

where H denotes the Hermitian operation. There are four subcarriers and three symbols in above computation. If the BS receives a MS's several slots signals in the same PUSC subchannels coherently, an average estimated uplink channel covariance matrix $R_{i_n}$ may be computed.

At 140, the beamforming weights of the uplink tiles are estimated using the channel covariance matrices computed at 130. Two methods are described herein to compute the beamforming weights of uplink tiles. The first method is based on the columns of the uplink channel covariance matrices $\{R_{i_n}\}_{n=1}^J$. The second method is based on the rows of the uplink channel covariance matrices $\{R_{i_n}\}_{n=1}^J$.

Sum Algorithm Based on Column Vectors

The first method using the columns of the uplink channel covariance matrices is now described. Based on the J estimated uplink channel covariance matrix $\{R_{i_n}\}_{n=1}^J$, let $R_{i_n} = [r_{i_n,1}\, r_{i_n,2} \ldots r_{i_n,M}]$, where $r_{i_n,m}$, for $1 \leq m \leq M$, is the mth column vector in $R_{i_n}$. Applying the maximum ratio combining, the sum of the columns of the uplink channel covariance matrix $R_{i_n}$ is computed as:

$U_{i_n} = r_{i_n,1} + e^{j\Theta_2} r_{i_n,2} + \ldots + e^{j\Theta_M} r_{i_n,M}$ where $e^{j\Theta_m} = \{r_{i_n,m}\}^H r_{i_n,1}/(abs(\{r_{i_n,m}\}^H r_{i_n,1}))$, for $2 \leq m \leq M$, is the phase rotation of the mth column related to the first column. The abs( ) denotes for absolute operation.

The sum of the columns of the uplink channel covariance matrix is normalized to obtain the beamforming weight $W_{i_n}$ as $W_{i_n} = U_{i_n}/(\text{norm }(U_{i_n}))$ where norm( ) is the Euclidean norm operation. After applying above sum algorithm to the estimated uplink channel covariance matrix $\{R_{i_n}\}_{n=1}^J$ in received J uplink tile, a group of the beamforming weights vectors $\{W_{i_n}\}_{n=1}^J$ is obtained for all received J uplink tiles.

Sum Algorithm Based on Row Vectors

The second method using rows of the uplink channel covariance matrices is now described. Based on the J estimated uplink channel covariance matrix $\{R_{i_n}\}_{n=1}^J$, let $$R_{i_n} = \begin{bmatrix} \tilde{r}_{i_n,1} \\ \tilde{r}_{i_n,2} \\ \vdots \\ \tilde{r}_{i_n,M} \end{bmatrix},$$

where $\tilde{r}_{i_n,m}$, for $1 \leq m \leq M$, is the mth row vector in $R_{i_n}$. Applying maximum ratio combining, the sum of the rows of the uplink channel covariance matrix $R_{i_n}$ is computed as: $U_{i_n} = \{\tilde{r}_{i_n,1} + e^{j\Phi_2}\tilde{r}_{i_n,2} + \ldots + e^{j\Phi_M}\tilde{r}_{i_n,M}\}^H$, where $e^{j\Phi_m} = \tilde{r}_{i_n,1}\{\tilde{r}_{i_n,m}\}^H/(abs(\tilde{r}_{i_n,1}\{\tilde{r}_{i_n,m}\}^H))$, for $2 \leq m \leq M$, is the phase rotation of the mth row related to the first row. The abs( ) denotes the absolute operation.

The sum of the rows of the uplink channel covariance matrix is normalized to obtain the beamforming weight $W_{i_n}$ as: $W_{i_n} = U_{i_n}/(\text{norm }(U_{i_n}))$, where norm( ) is the Euclidean norm operation. After applying sum algorithm to the estimated uplink channel covariance matrix $\{R_{i_n}\}_{n=1}^J$ in received J uplink tile, a group of the beamforming weights vectors $\{W_{i_n}\}_{n=1}^J$ is obtained for all received J uplink tiles.

Next, at 150, a spatial projection is computed for the beamforming weights of the uplink tiles. Conceptually, the space in which the BS 10 resides is divided into $N_{subsector}$ spatial subsectors or segments. Using the beamforming weights $\{W_{i_n}\}_{n=1}^J$ that are computed at 140, the spatial projection of the estimated beamforming weights of the J uplink tiles to $N_{subsector}$ subsectors is computed.

It is well known that if the absolute value of the spatial projection to a subsector is large, the signal should be received in the direction of the corresponding subsector. In other words, the direction of arrival (DOA) of desired signals is the direction of the corresponding subsector. On the other hand, if the absolute value of the spatial projection to a subsector is very small, the desired signals are said not to arrive from the direction of the corresponding subsector, implying that the value of projection is generated by noise and the noise part should be removed from the estimated beamforming weights to improve the beamforming performance.

The values of the spatial projection are complex values. Two spatial projection computation methods are described herein: a Fast Fourier Transform (FFT) spatial projection method and a general spatial projection method. When the BS's antenna array of is linear, equal-spaced and the spacing is approximately half wavelength, the FFT spatial projection method may be the preferred technique because the FFT spatial projection method is very efficient with good performance and low computation complexity. However, if the BS's antenna array is any other antenna pattern, the general spatial projection method may be used.

FFT Spatial Projection Method

The FFT spatial projection method is now described. For each beamforming weight vector $W_{i_n}$, the group of the beamforming weights vectors $\{W_{i_n}\}_{n=1}^J$, an FFT operation is applied with FFT size $N_{subsector}$, to obtain the spatial projection gain vector in $N_{subsector}$ subsectors as: $G_{i_n}=FFT(W_{i_n}, N_{subsector})$. The number of subsectors $N_{subsector}$ may be selected to be larger than or equal to the number of antennas M of the BS 10. For example, if the number of antennas M of BS 10 is eight (8), the number of subsectors $N_{subsector}$ may be selected to be 16. When the number of antennas M is smaller than the number of subsectors $N_{subsector}$, zero padding may be applied to the vector $W_{i_n}$ in order to implement the FFT operation with size $N_{subsector}$.

The spatial projection gain vector $G_{i_n}$ is denoted: $G_{i_n}=[g_{i_n,1} \; g_{i_n,2} \cdots g_{i_n,N_{subsector}}]^T$, where the scalar $g_{i_n,k}$ is the complex-valued spatial projection gain for the subsector k and the received uplink tile n. T denotes the Transpose operation.

Next, for each subsector k, where $1 \leq k \leq N_{subsector}$, the spatial projection gains in all J received uplink tiles are combined as:

$$P_k = \sum_{n=1}^{J} |g_{i_n,k}|^2,$$

where |x| is the absolute value of x.

For the purpose of estimating the DOA of signals from the specific MS (based on the computed uplink beamforming weights), a threshold $P_{threshold}$ is used. For example, the threshold $P_{threshold}$ is set as:

$$P_{threshold} = \frac{1}{N_{subsector}} \sum_{k=1}^{N_{subsector}} P_k - \frac{1}{3} 10^{SNR/10} \sqrt{\frac{1}{N_{subsector}-1} \sum_{k=1}^{N_{subsector}} \left| P_k - \frac{1}{N_{subsector}} \sum_{k=1}^{N_{subsector}} P_k \right|^2},$$

where SNR is the estimated physical signal-to-noise ratio (SNR) in the received PUSC subchannels from the specific MS.

When $P_k < P_{threshold}$, the spatial projection gain of subsector k is determined to be due to noise/interference. In this case, the spatial projection is updated in order to remove the projection gain of noise/interference in some subsectors by setting $$g_{i_n,k} = \begin{cases} 0 & \text{if } P_k < P_{threshold} \\ g_{i_n,k} & \text{if } P_k \geq P_{threshold} \end{cases}$$

for all received uplink tiles ($1 \leq n \leq J$) After this updating process (if necessary), a group of updated complex-valued spatial projection gain values $g_{i_n,k}$, for $1 \leq n \leq J$ and $1 \leq k \leq N_{subsector}$ is obtained.

General Spatial Projection Method

Let $A(\theta,\lambda)$ denote an array steering vector (or array response vector) for the DOA (direction of arrival) $\theta$, and $\lambda$ the uplink or downlink carrier wavelength ($\lambda_{UL}$ or $\lambda_{DL}$). For example, for a uniform circular array (UCA), $$A(\theta, \lambda) = \left[ e^{-j\frac{2\pi r}{\lambda}\cos(\theta)} \; e^{-j\frac{2\pi r}{\lambda}\cos\left(\theta-\frac{2\pi}{M}\right)} \; \cdots \; e^{-j\frac{2\pi r}{\lambda}\cos\left(\theta-\frac{(M-1)2\pi}{M}\right)} \right]^T$$

where T stands for Transpose operation and r is the radius of the circular array. For a uniform linear array (ULA), $$A(\theta, \lambda) = \left[ 1 \; e^{j\frac{2\pi D}{\lambda}\sin(\theta)} \; \cdots \; e^{j\frac{2\pi D}{\lambda}(M-1)\sin(\theta)} \right]^T$$

where D is the distance between two adjacent antennas. The array steering (response) vector $A(\theta, \lambda)$ is used to generate a projection matrix $\Xi$.

For each subsector, an angle $\phi_k$ is chosen in the subsector, for $1 \leq k \leq N_{subsector}$. The projection matrix is computed as: $\Xi=[A(\phi_1,\lambda) \; A(\phi_2,\lambda) \ldots A(\phi_{N_{subsector}},\lambda)]$. For each beamforming weight vector $W_{i_n}$ in the group of the beamforming weights vectors $\{W_{i_n}\}_{n=1}^J$, the projection matrix $\Xi$ is applied to the beamforming weight vector $W_{i_n}$, to obtain the spatial projection gain vector in $N_{subsector}$ subsectors as $G_{i_n}=\Xi^H W_{i_n}$, where H denotes the Hermitian operation.

The number of subsectors $N_{subsector}$ may be set to be greater than or equal to the number of antennas M in base station, as described above, such that the angle range of a subsector approximately 10 degrees.

The spatial projection gain vector $G_{i_n}$ is denoted $G_{i_n}=[g_{i_n,1} \; g_{i_n,2} \cdots g_{i_n,N_{subsector}}]^T$, where the scalar $g_{i_n,k}$ is the complex-valued spatial projection gain for the subsector k and the received uplink tile n. Next, for each subsector k, where $1 \leq k \leq N_{subsector}$, the spatial projection gains in all J received uplink tiles are combined as $$P_k = \sum_{n=1}^{J} |g_{i_n,k}|^2,$$

where | | denotes the absolute value operation. At this point, the technique of updating of the spatial projection gain, described above for the FFT spatial projection computation method, is also used here using a $P_{threshold}$.

Next, at 160, the frequency domain variation is computed by estimating the time difference between signals from different DOAs. As indicated above, a DOA is determined based on the subsector-based spatial projection computation at 150. The variation of channel information in frequency domain is due to the difference in arrival of multipath signals. Since it is desired to track the variation of ideal beamforming weights in all frequency bands, the time difference between signals from different DOAs is estimated.

To this end, first, the subsector/DOA with the maximum power is denoted $k_{max}$, where $$k_{max} = \arg\max_{k} P_k. \qquad 5$$

For each tile in J received uplink tiles, the value of the spatial projection in the subsector/DOA is divided by $k_{max}$, to compute the vector of the relative spatial projection gain $\tilde{G}_{i_n}$ as:

$$\tilde{G}_{i_n} = \frac{G_{i_n}}{g_{i_n,k_{max}}}$$

$$= \frac{[g_{i_n,1} \ g_{i_n,2} \ \cdots \ g_{i_n,N_{subsector}}]^T}{g_{i_n,k_{max}}}$$

$$= [\tilde{g}_{i_n,1} \ \tilde{g}_{i_n,2} \ \cdots \ \tilde{g}_{i_n,N_{subsector}}]^T.$$

The calculation of relative spatial projection gain $\tilde{G}_{i_n}$ removes the phase shift generated in the process of estimation of the beamforming weights in the received uplink tile n.

Next, the time difference between all estimated DOAs where $|\tilde{g}_{i_n,k}|>0$ and the DOA with the maximum power that is in subsector $k_{max}$. For each $k \in [1, N_{subsector}]$, if $|\tilde{g}_{i_n,k}|>0$, the following computations are made:

(1) Form a row vector $$Q_k \text{ as } Q_k = \frac{[\tilde{g}_{2,k} \ \tilde{g}_{3,k} \ \cdots \ \tilde{g}_{J,k}]}{\tilde{g}_{1,k}} = [q_{1,k} \ q_{2,k} \ \cdots \ q_{J-1,k}],$$

where $q_{v,k}$ for $1 \leq v \leq J-1$ is the element in the vector $Q_k$. The row vector $Q_k$ is computed to remove the common phase shift for all frequency bands by taking the relative values to the first received tile.

(2) Update $Q_k$ by normalizing each element in $Q_k$ as $$Q_k = \left[ \frac{q_{1,k}}{|q_{1,k}|} \ \frac{q_{2,k}}{|q_{2,k}|} \ \cdots \ \frac{q_{J-1,k}}{|q_{J-1,k}|} \right]$$

$$= [\tilde{q}_{1,k} \ \tilde{q}_{2,k} \ \cdots \ \tilde{q}_{J-1,k}],$$

where $|q_{v,k}|$ is the absolute value of $q_{v,k}$ for $1 \leq v \leq J-1$, and $\tilde{q}_{v,k}$ for $1 \leq v \leq J-1$ is the element in the updated vector $Q_k$.

(3) Obtain the frequency difference between the nth tile for $2 \leq n \leq J$ and the first tile as $F_{diff}=[f_1 \ f_2 \ \cdots \ f_{J-1}]^T = [i_2-i_1 \ i_3-i_1 \ldots i_J-i_1]^T$, where T stands for Transpose operation. The frequency difference is in the units of subcarrier spacing frequency.

(4) Set the range of time difference in the unit of sampling interval. First, denote a vector $D_k$ as $D_k=[|q_{2,k}-q_{1,k}|, |q_{3,k}-q_{2,k}|, \ldots, |q_{J-1,k}-q_{J-2,k}|]=[d_{1,k} \ d_{2,k} \ \cdots \ d_{J-2,k}]$ Calculate the mean value of the all elements in the vector $D_k$ as $$\bar{d}_k = \frac{1}{J-2} \sum_{v=1}^{J-2} d_{v,k}$$

Then set the vector of time difference $T_{diff}$ as $$T_{diff,k} = \begin{cases} [-c_1:c_1] & \text{if} \quad \bar{d}_k > a_1 \\ [-c_2:c_2] & \text{if} \quad a_1 \geq \bar{d}_k > a_2 \\ [-c_3:c_3] & \text{if} \quad \bar{d}_k \leq a_2 \end{cases}$$

where $T_{diff,k}=[\tau_1 \ \tau_2 \ \cdots \ \tau_{N_{time}}]$, $N_{time}$ is the number of elements of the vector of time difference, $a_1$, $a_2$, $c_1$, $c_2$, $c_3$ are practical parameters.

(5) Generate the phase matrix $\Phi$ as $\Phi=2\pi F_{diff} T_{diff,k}/L$, where, for example, L is the FFT size of FFT in a WiMAX communication system.

(6) Process the fine searching. For example, obtain the three minimum peaks corresponding to three values of the time difference. First, calculate a matrix as $$E_{diff,k} = \text{abs}(e^{j\Phi} - kron(ones(N_{time}, 1), Q_k))$$

$$= \begin{bmatrix} \varepsilon_{f_1,\tau_1} & \varepsilon_{f_1,\tau_2} & \cdots & \varepsilon_{f_1,\tau_{N_{time}}} \\ \varepsilon_{f_2,\tau_1} & \varepsilon_{f_2,\tau_2} & \cdots & \varepsilon_{f_2,\tau_{N_{time}}} \\ \vdots & \vdots & \ddots & \vdots \\ \varepsilon_{f_{J-1},\tau_1} & \varepsilon_{f_{J-1},\tau_2} & \cdots & \varepsilon_{f_{J-1},\tau_{N_{time}}} \end{bmatrix}$$

where kron(X,Y) is the Kronecker tensor product of X and Y, ones(N,1) is a column vector with N ones, and abs( ) stands for taking absolute value of each element in the matrix. $\varepsilon_{f_v,\tau_u}$, for $1 \leq v \leq J-1$ and $1 \leq u \leq N_{time}$, is an element in the matrix $E_{diff,k}$. The three values of the time difference which are corresponding the three minimum peaks are obtained as $$[\tau_{peak\,1} \ \tau_{peak\,2} \ \tau_{peak\,3}] = \arg \min_{\tau_u} \left\{ \sum_{v=1}^{J-1} \varepsilon_{f_v,\tau_u} \right\}$$

(7) Update the vector of time difference $T_{diff}$ as $$T_{diff,k} = \begin{bmatrix} \tau_{peak\,1} + \left[ \frac{-1}{2} \ \frac{-1}{4} \ 0 \ \frac{1}{4} \ \frac{1}{2} \right], \\ \tau_{peak\,2} + \left[ \frac{-1}{2} \ \frac{-1}{4} \ 0 \ \frac{1}{4} \ \frac{1}{2} \right], \\ \tau_{peak\,3} + \left[ \frac{-1}{2} \ \frac{-1}{4} \ 0 \ \frac{1}{4} \ \frac{1}{2} \right], \end{bmatrix}.$$

(8) Update the phase matrix $\Phi$ as $\Phi=2\pi F_{diff} T_{diff,k}/L$, where L is the size of FFT in the WiMAX communication system.

(9) Finally, the time difference $\alpha_k$ between the kth subsector and the $k_{max}$th subsector is obtained. First, calculate a matrix as $$E_{diff,k} = \text{abs}(e^{j\Phi} - kron(\text{ones}(15, 1), Q_k))$$

$$= \begin{bmatrix} \varepsilon_{f_1,\tau_1} & \varepsilon_{f_1,\tau_2} & \cdots & \varepsilon_{f_1,\tau_{15}} \\ \varepsilon_{f_2,\tau_1} & \varepsilon_{f_2,\tau_2} & \cdots & \varepsilon_{f_2,\tau_{15}} \\ \vdots & \vdots & \ddots & \vdots \\ \varepsilon_{f_{J-1},\tau_1} & \varepsilon_{f_{J-1},\tau_2} & \cdots & \varepsilon_{f_{J-1},\tau_{15}} \end{bmatrix}$$

where kron(X,Y) is the Kronecker tensor product of X and Y, ones(15,1) is a column vector with 15 ones, and abs( ) stands for taking absolute value of each element in the matrix. $\epsilon_{f_v,\tau_u}$, for $1 \leq v \leq J-1$ and $1 \leq u \leq 15$, is a element in the matrix $E_{diff,k}$. Then the values of the time difference which correspond to the minimum peak as $$\tau_{peak} = \arg\min_{\tau_u}\left\{\sum_{v=1}^{J-1}\epsilon_{f_v,\tau_u}\right\} \text{ are obtained.}$$

Finally the time difference $\alpha_k$ between the kth subsector and the $k_{max}$th subsector as $\alpha_k = \tau_{peak}$ is obtained. A group of time difference values $\{\alpha_k\}$ are those computed for all subsectors with $|\tilde{g}_{i_n,k}| > 0$.

Next, at 170, the estimated spatial projection for any frequency band y is computed. Two methods are described herein to estimate the spatial projection gain for frequency band y. The first method is based on the phase rotation of the spatial projection in the closest received tile and the second method is based on the estimated parameters of a main path in each subsector. The performance of the second method is slightly better than that of the first method in low SNR conditions.

Phase Rotation of the Spatial Projection in the Closest Received Tile Method

Assume it is desired to estimate the spatial projection gain of the index of the subcarrier y. First we calculate the index of the closest received tile as $$i_{closest} = \arg\min_{i_n}|y - i_n|,$$

where $1 \leq n \leq J$. For $k \in [1, N_{subsector}]$, applying the time difference $\alpha_k$ and the FFT size L in a WiMAX system, the spatial projection gain for the frequency subcarrier y is obtained as $$\tilde{g}_{y,k} = \begin{cases} \tilde{g}_{i_{closest},k} e^{j2\pi\alpha_k(y-i_{closest})/L} & \text{if } |\tilde{g}_{i_{closest},k}| > 0 \\ 0 & \text{if } |\tilde{g}_{i_{closest},k}| = 0 \end{cases}, \text{ where}$$

$2\pi\alpha_k(y-i_{closest})/L$ is the phase rotation to the spatial projection gain of the closest received tile.

If it is desired to estimate downlink beamforming weights in a frequency band spanned by Y subcarriers $y_l$, the estimated spatial projection gain for each subcarrier $y_l$ is computed as $\tilde{G}_{y_l} = [\tilde{g}_{y_l,1} \tilde{g}_{y_l,2} \cdots \tilde{g}_{y_l,N_{subsector}}]^T$, where T stands for Transpose operation, and $1 \leq l \leq Y$.

Phase Rotation Based on Parameters of Main Path Per Subsector Method

Based on a group of values of the time difference $\{\alpha_k\}$ between the kth subsector and the $k_{max}$th subsector, for all k with $|\tilde{g}_{i_n,k}| > 0$, e a vector $\Omega_k$ is computed as $\Omega_k = e^{j2\pi\alpha_k[i_1 i_2 \cdots i_J]/L}$.

Combining the vector $\Omega_k$ and the spatial projection gain in J received uplink tiles $\tilde{g}_{i_n,k}$, for $1 \leq n \leq J$ the parameter $h_k$ of main path in kth subsector is obtained as $h_k = [\tilde{g}_{i_1,k} \tilde{g}_{i_2,k} \cdots \tilde{g}_{i_J,k}]\Omega_k^H$, where H stands for Hermitian operation.

Based on the parameters $\{h_k\}$, the spatial projection gain in J received uplink tile is updated as $$\tilde{g}_{i_n,k} = \begin{cases} h_k e^{j2\pi\alpha_k i_n/L} & \text{if } |\tilde{g}_{i_n,k}| > 0 \\ 0 & \text{if } |\tilde{g}_{i_n,k}| = 0 \end{cases}.$$

If it is desired to estimate the spatial projection gain in a frequency band spanned by Y subcarriers $y_l$, the spatial projection gain for each subcarrier $y_l$, is computed as $$\tilde{g}_{y,k} = \begin{cases} h_k e^{j2\pi\alpha_k y/L} & \text{if } |\tilde{g}_{i_1,k}| > 0 \\ 0 & \text{if } |\tilde{g}_{i_1,k}| = 0 \end{cases},$$

where $2\pi\alpha_k y/L$ is the phase rotation based on parameter of main path in kth subsector.

If it is desired to estimate downlink beamforming weights in a frequency band spanned by Y subcarriers $y_l$ the estimated spatial projection gain for each subcarrier $y_l$ is computed as $\tilde{G}_{y_l} = [\tilde{g}_{y_l,1} \tilde{g}_{y_l,2} \cdots \tilde{g}_{y_l,N_{subsector}}]^T$, where T stands for Transpose operation, and $1 \leq l \leq Y$.

Now, at 180, the downlink beamforming weights are computed by spatial inversion. At 170, the vector of the $N_{subsector}$ spatial projection gain for each desired frequency band was computed $\tilde{G}_{y_l}$ for $1 \leq l \leq Y$. Using the spatial projection information computed at 150, two methods of inversion of the spatial projection are provided to compute the downlink beamforming weights. If the FFT spatial projection method is employed at 150, then an Inverse FFT (IFFT)-based inversion method is used as described below to compute the estimated downlink beamforming weights. If the general spatial projection method is employed at 150, then a general method of version of the spatial projection is used as described hereinafter.

IFFT-based Inversion of Spatial Projection Method

For the estimated spatial projection vector $\tilde{G}_{y_l}$ in the group of the estimated spatial projection vectors $\{\tilde{G}_{y_l}\}_{l=1}^Y$, an IFFT operation with size $N_{subsector}$ is used to obtain the vector of the inversion of the spatial projection as $\tilde{W}_{y_l} = \text{IFFT}(\tilde{G}_{y_l}, N_{subsector}) = [\tilde{w}_{y_l,1} \tilde{w}_{y_l,2} \cdots \tilde{w}_{y_l,N_{subsector}}]^T$. Finally, the estimated beamforming weights $W_{y_l}$ in a frequency band spanned by Y subcarriers $y_l$ can be computed as $W_{y_l} = [\tilde{w}_{y_l,1} \tilde{w}_{y_l,2} \cdots \tilde{w}_{y_l,M}]^T / \text{norm}\{[\tilde{w}_{y_l,1} \tilde{w}_{y_l,2} \cdots \tilde{w}_{y_l,M}]^T\}$, for $1 \leq l \leq Y$. For example, if we estimate a beamforming weights for each downlink PUSC cluster, Y=30 when the FFT size L=512.

General Method of Inversion of Spatial Projection

For each estimated spatial projection vector $\tilde{G}_{y_l}$ in the group of the estimated spatial projection vectors $\{\tilde{G}_{y_l}\}_{l=1}^Y$, the projection matrix $\Xi$ is applied to the estimated spatial projection vector $\tilde{G}_{y_l}$ to obtain the vector of the inversion of the spatial projection as $\tilde{W}_{y_l} = \{\Xi\Xi^H\}^{-1}\Xi\tilde{G}_{y_l} = [\tilde{w}_{y_l,1} \tilde{w}_{y_l,2} \cdots \tilde{w}_{y_l,M}]^T$. Finally, the estimated beamforming weights $W_{y_l}$ in a frequency band spanned by Y subcarriers $y_l$ can be computed as $W_{y_l} = [\tilde{w}_{y_l,1} \tilde{w}_{y_l,2} \cdots \tilde{w}_{y_l,M}]^T / \text{norm}\{[\tilde{w}_{y_l,1} \tilde{w}_{y_l,2} \cdots \tilde{w}_{y_l,M}]^T\}$, for $1 \leq l \leq Y$. For example, if we estimate a beamforming weights for each downlink PUSC cluster, Y=30 when the FFT size L=512.

Compared to methods heretofore known, the techniques described herein significantly improve the beamforming performance when there is the frequency mismatch, and the computation complexity of these techniques is relatively minimal.

Although the apparatus, system, and method for the frequency band extrapolation beamforming weight computation techniques are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method for the frequency band extrapolation beamforming weight computation techniques, as set forth in the following claims.

What is claimed is:

1. A method comprising:
   at a first communication device, receiving a transmission at a plurality of antennas from a second communication device, wherein the transmission uses some but not all frequency subbands within a frequency band space;
   recovering baseband signals carried in the frequency subbands in the received transmission;
   computing a channel covariance matrix from the baseband signals in the frequency subbands with respect to the plurality of antennas of the first communication device;
   computing uplink beamforming weights from the baseband signals in the frequency subband from the channel covariance matrix;
   computing a spatial projection of the uplink beamforming weights;
   computing frequency domain variations in the channel between the first communication device and the second communication device based on difference in time of arrival of signals from different direction of arrivals at the plurality of antennas of the first communication device;
   computing a downlink spatial projection for a given frequency subband from the frequency domain variations and the spatial projection of the uplink beamforming weights; and
   computing downlink beamforming weights from the downlink spatial projection, wherein the downlink beamforming weights are for use by the first communication device when beamforming a downlink transmission via the plurality of antennas of the first communication device to the second communication device.

2. The method of claim 1, wherein the transmission from the second communication device comprises a plurality of subcarriers at different frequencies in each of a plurality of tiles, and wherein computing the channel covariance matrix comprises computing J instantaneous channel covariance matrices in the frequency domain as a group of matrices $\{R_{i_n}\}_{n=1}^J$, where J is the number of tiles, $i_1, i_2, \ldots, i_J$ are the index of baseband signals for subcarriers in J tiles respectively, and wherein computing the uplink beamforming weights comprises computing a group of beamforming weight vectors $\{W_{i_n}\}_{n=1}^J$ for the J tiles.

3. The method of claim 2, wherein computing the channel covariance matrix for a tile comprises computing $$R_{i_n} = \frac{1}{12} \sum_j \sum_q \begin{bmatrix} S_{j,q}(1) \\ S_{j,q}(2) \\ \vdots \\ S_{j,q}(M) \end{bmatrix} \begin{bmatrix} S_{j,q}(1) \\ S_{j,q}(2) \\ \vdots \\ S_{j,q}(M) \end{bmatrix}^H,$$

where a maximum number of subcarriers is L, such that $1 \leq i_1 < i_2 < \ldots < i_J \leq L$, and $S_{j,q}(m)$ for $1 \leq m \leq M$ denotes received frequency domain signals on the jth subcarrier, the qth symbol, and mth antenna of the first communication device and M is the number of antennas of the first communication device.

4. The method of claim 2, wherein computing the uplink beamforming weights is based on columns of the channel covariance matrices.

5. The method of claim 4, wherein computing the uplink beamforming weights comprises maximal ratio combining of signals received at the plurality of antennas to obtain a sum of columns of channel covariance matrix $R_{i_n}$ as $U_{i_n} = r_{i_n,1} + e^{j\Theta_2} r_{i_n,2} + \ldots + e^{j\Theta_M} r_{i_n,M}$, where $R_{i_n} = [r_{i_n,1}\ r_{i_n,2} \ldots r_{i_n,M}]$, and $r_{i_n,m}$ for $1 \leq m \leq M$, is the mth column vector in $R_{i_n}$, $e_{j\Theta}{}^m = \{r_{i_n,m}\}^H r_{i_n,1}/(\text{abs}(\{r_{i_n,m}\}^H r_{i_n,1}))$, for $2 \leq m \leq M$, is the phase rotation of the mth column related to the first column, and abs( ) stands for absolute operation.

6. The method of claim 5, wherein computing the uplink beamforming weights further comprises normalizing the sum of the columns of the channel covariance matrices to produce a beamforming weight vector $W_{i_n}$ as $W_{i_n} = U_{i_n}/(\text{norm}(U_{i_n}))$, where norm( ) is the Euclidean norm operation, thereby obtaining a group of beamforming weight vectors $\{W_{i_n}\}_{n=1}^J$ for the J tiles.

7. The method of claim 2, wherein computing the uplink beamforming weights is based on rows of the channel covariance matrices.

8. The method of claim 7, wherein computing the uplink beamforming weights comprises maximal ratio combining of signals received at the plurality of antennas to obtain a sum of rows of the channel covariance matrices $R_{i_n}$ as $U_{i_n} = \{\tilde{r}_{i_n,1} + e^{j\Phi_2}\tilde{r}_{i_n,2} + \ldots + e^{j\Phi_M}\tilde{r}_{i_n,M}\}^H$, where $$R_{i_n} = \begin{bmatrix} \tilde{r}_{i_n,1} \\ \tilde{r}_{i_n,2} \\ \vdots \\ \tilde{r}_{i_n,M} \end{bmatrix},$$

$\tilde{r}_{i_n,m}$, for $1 \leq m \leq M$, is the mth row vector in $R_{i_n}$, $e^{j\Phi_m} = \tilde{r}_{i_n,1}\{\tilde{r}_{i_n,m}\}^H/(\text{abs}(\tilde{r}_{i_n,1}\{\tilde{r}_{i_n,m}\}^H))$, for $2 \leq m \leq M$, is the phase rotation of the mth row related to the first row, and abs( ) stands for absolute operation and H is the Hermitian operation.

9. The method of claim 8, wherein computing the uplink beamforming weights further comprises normalizing the sum of the rows of the channel matrices to produce a beamforming weight $W_{i_n}$ as $W_{i_n} = U_{i_n}/(\text{norm}(U_{i_n}))$, where norm( ) is the Euclidean norm operation, thereby obtaining a group of beamforming weight vectors $\{W_{i_n}\}_{n=1}^J$ for the J tiles.

10. The method of claim 2, wherein computing the spatial projection of the uplink beamforming weights comprises computing a spatial projection gain vector $G_{i_n}$ for the beamforming weight vectors $\{W_{i_n}\}_{n=1}^J$ of the J tiles to $N_{subsector}$ subsectors in a space in which the first and second communication devices reside is divided, where $G_{i_n} = [g_{i_n,1}\ g_{i_n,2} \ldots g_{i_n,N_{subsector}}]^T$, $g_{i_n,k}$ is a complex-valued spatial projection gain for the subsector k and the received uplink tile n, and T denotes the Transpose operation.

11. The method of claim 10, wherein computing the spatial projection gain of the uplink beamforming weights comprises computing, for each beamforming weight vector $W_{i_n}$ in the group of the beamforming weights vectors $\{W_{i_n}\}_{n=1}^J$, a Fast Fourier Transform operation with size $N_{subsector}$, to obtain the spatial projection gain vector $G_{i_n} = \text{FFT}(W_{i_n}, N_{subsector})$ in $N_{subsector}$ subsectors, and combining the spatial projection gains in all J received tiles as $$P_K = \sum_{n=1}^{J} |g_{i_n,k}|^2,$$

for each subsector k, where $1 \leq k \leq N_{subsector}$.

12. The method of claim 10, wherein computing the spatial projection gain comprises computing an array response vector $A(\theta, \lambda)$ for the plurality of antennas of the first communication device $A(\theta, \lambda)$ for a direction of arrival $\theta$ and a subcarrier wavelength $\lambda$ associated with the received uplink transmission; computing a projection matrix $\Xi = [A(\phi_1, \lambda) A(\phi_2, \lambda) \ldots A(\phi_{N_{subsector}}, \lambda)]$, for an angle $\phi_k$ in the subsector, for $1 \leq k \leq N_{subsector}$, for each beamforming weight vector $W_{i_n}$ in the group of the beamforming weights vectors $\{W_{i_n}\}_{n=1}^{J}$, applying the projection matrix $\Xi$ to beamforming weight vector $W_{i_n}$ to obtain the spatial projection gain vector $G_{i_n}$ in $N_{subsector}$ subsectors as $G_{i_n} = \Xi^H W_{i_n}$, where H is Hermitian operation.

13. The method of claim 10, wherein computing the spatial projection gain further comprises comparing the spatial projection gain $P_k$ summed over all J received uplink tiles for a sector$_k$ with a threshold such that $$g_{i_n,k} = \begin{cases} 0 & \text{if } P_k < P_{threshold} \\ g_{i_n,k} & \text{if } P_k \geq P_{threshold} \end{cases}$$

for all received uplink tiles ($1 \leq n \leq J$) and for all sectors $1 \leq k \leq N_{subsector}$.

14. The method of claim 10, wherein computing frequency domain variations comprises determining which subsector has the greatest power, denoted subsector $k_{max}$, where $$k_{max} = \arg\max_{k} P_k;$$

computing a vector of the relative spatial projection gain $\tilde{G}_{i_n}$ as $$\tilde{G}_{i_n} = \frac{G_{i_n}}{g_{i_n,k_{max}}}$$
$$= \frac{[g_{i_n,1} \; g_{i_n,2} \; \cdots \; g_{i_n,N_{subsector}}]^T}{g_{i_n,k_{max}}}$$
$$= [\tilde{g}_{i_n,1} \; \tilde{g}_{i_n,2} \; \cdots \; \tilde{g}_{i_n,N_{subsector}}]^T,$$

where T denotes for Transpose operation; and computing a time difference of arrival of signals at from subsectors in which $|\tilde{g}_{i_n,k}| > 0$ and the arrival of signals from the subsector $k_{max}$ with the maximum power to produce a group of time difference values $\{\alpha_k\}$ for all subsectors with $|\tilde{g}_{i_n,k}| > 0$.

15. The method of claim 14, and further comprising computing the spatial projection gain for a frequency band spanned by Y subcarriers $y_l$, such that the spatial projection gain for each subcarrier $y_l$ is $\tilde{G}_{y_l} = [\tilde{g}_{y_l,1} \; \tilde{g}_{y_l,2} \; \cdots \; \tilde{g}_{y_l,N_{subsector}}]^T$, where T denotes the Transpose operation, and $1 \leq l \leq Y$.

16. The method of claim 15, wherein computing the downlink spatial projection comprises computing, for a given subcarrier y, an index of a closest received tile to the subcarrier y, $$i_{closest} = \arg\min_{i_n} |y - i_n|,$$

where $1 \leq n \leq J$; and for $k \in [1, N_{subsector}]$, applying the time difference $\alpha_k$ using a Fast Fourier Transform size L, to produce the spatial projection gain for the frequency subcarrier y as $$\tilde{g}_{y,k} = \begin{cases} \tilde{g}_{i_{closest},k} e^{j2\pi\alpha_k(y - i_{closest})/L} & \text{if } |\tilde{g}_{i_{closest},k}| > 0 \\ 0 & \text{if } |\tilde{g}_{i_{closest},k}| = 0 \end{cases}$$

where $2\pi\alpha_k(y - i_{closest})/L$ is a phase rotation to the spatial projection gain of the closest received tile; and computing the spatial projection gain for a frequency band spanned by Y subcarrier $y_l$, such that the spatial projection gain for each frequency subcarrier $y_l$ is $\tilde{G}_{y_l} = [\tilde{g}_{y_l,1} \; \tilde{g}_{y_l,2} \; \cdots \; \tilde{g}_{y_l,N_{subsector}}]^T$, where T denotes the Transpose operation, and $1 \leq l \leq Y$.

17. The method of claim 15, wherein computing the downlink spatial projection comprises computing a vector $\Omega_k$ as $\Omega_k = e^{j2\pi\alpha_k[i_1 \; i_2 \; \cdots \; i_J]/L}$ using the group of time difference values $\{\alpha_k\}$ between the kth subsector and the $k_{max}$ subsector, for all k with $|\tilde{g}_{i_n,k}| > 0$; computing a parameter $h_k = [\tilde{g}_{i_1,k} \; \tilde{g}_{i_2,k} \; \cdots \; \tilde{g}_{i_J,k}] \Omega_k^H$ from the vector $\Omega_k$ and the spatial projection gain in J received uplink tiles $\tilde{g}_{i_n,k}$, for $1 \leq n \leq J$, where H denotes the Hermitian operation; updating the spatial projection gain in the J uplink tiles using the parameters $\{h_k\}$ such that $$\tilde{g}_{i_n,k} = \begin{cases} h_k e^{j2\pi\alpha_k i_n/L} & \text{if } |\tilde{g}_{i_n,k}| > 0 \\ 0 & \text{if } |\tilde{g}_{i_n,k}| = 0 \end{cases};$$

computing the spatial projection gain for subcarrier index y as $$\tilde{g}_{y,k} = \begin{cases} h_k e^{j2\pi\alpha_k y/L} & \text{if } |\tilde{g}_{i_1,k}| > 0 \\ 0 & \text{if } |\tilde{g}_{i_1,k}| = 0 \end{cases},$$

where $2\pi\alpha_k y/L$ is the phase rotation based on the $h_k$ parameter of main path in kth subsector; and computing the spatial projection gain for a frequency band spanned by Y subcarriers $y_l$, such that the spatial projection gain for each frequency subcarrier $y_l$ is $\tilde{G}_{y_l} = [\tilde{g}_{y_l,1} \; \tilde{g}_{y_l,2} \; \cdots \; \tilde{g}_{y_l,N_{subsector}}]^T$, where T denotes the Transpose operation, and $1 \leq l \leq Y$.

18. The method of claim 14, wherein computing the downlink beamforming weights comprises computing an Inverse Fast Fourier Transform of the estimated spatial projection vector $\tilde{G}_{y_l}$ in the group of the estimated spatial projection vectors $\{\tilde{G}_{y_l}\}_{l=1}^{Y}$, to obtain a vector of the inversion of the spatial projection as $\tilde{W}_{y_l} = \text{IFFT}(\tilde{G}_{y_l}, N_{subsector}) = [\tilde{w}_{y_l,1} \; \tilde{w}_{y_l,2} \; \cdots \; \tilde{w}_{y_l,N_{subsector}}]^T$, and where the downlink beamforming weights $W_{y_l}$ in a frequency band spanned by Y subcarriers $y_l$ are $W_{y_l} = [\tilde{w}_{y_l,1} \; \tilde{w}_{y_l,2} \; \cdots \; \tilde{w}_{y_l,M}]^T / \text{norm}\{[\tilde{w}_{y_l,1} \; \tilde{w}_{y_l,2} \; \cdots \; \tilde{w}_{y_l,M}]^T\}$ for $1 \leq l \leq Y$.

19. The method of claim 12, and computing the spatial projection gain in a frequency band spanned by Y subcarriers $y_l$, such that the spatial projection gain for each frequency subcarrier $y_l$ is $\tilde{G}_{y_l} = [\tilde{g}_{y_l,1} \; \tilde{g}_{y_l,2} \; \cdots \; \tilde{g}_{y_l,N_{subsector}}]^T$, where T denotes the Transpose operation, and $1 \leq l \leq Y$.

20. The method of claim 14, wherein computing the downlink beamforming weights comprises computing for each estimated spatial projection vector $\tilde{G}_{y_l}$ in the group of the estimated spatial projection vectors $\{\tilde{G}_{y_l}\}_{l=1}^Y$, $\tilde{W}_{y_l} = \{\Xi\Xi^H\}^{-1}\Xi\tilde{G}_{y_l} = [\tilde{w}_{y_l,1}\ \tilde{w}_{y_l,2}\ \ldots\ \tilde{w}_{y_l,M}]^T$, where T denotes the transpose operator and H denotes the Hermitian operation, and where the downlink beamforming weights $W_{y_l}$ in a frequency band spanned by Y subcarriers $y_l$ are $W_{y_l} = [\tilde{w}_{y_l,1}\ \tilde{w}_{y_l,2}\ \ldots\ \tilde{w}_{y_l,M}]^T / \text{norm}\{[\tilde{w}_{y_l,1}\ \tilde{w}_{y_l,2}\ \ldots\ \tilde{w}_{y_l,M}]^T\}$ for $1 \leq l \leq Y$.

21. An apparatus comprising:

a plurality of antennas;

a transmitter coupled to the plurality of antennas, wherein the transmitter is configured to apply beamforming weights to a transmit signal to generate corresponding ones of a plurality of weighted signals that are supplied to respective ones of the plurality of antennas;

a controller coupled to the transmitter configured to:

store data representing reception of a transmission sent by another communication device and received at the plurality of antennas, wherein the transmission uses some but not all frequency subbands within a frequency band space and wherein the data represents baseband signals carried in the frequency subbands of the received transmission;

compute a channel covariance matrix from data representing the baseband signals in the frequency subbands with respect to the plurality of antennas of the first communication device;

compute uplink beamforming weights from the baseband signals in the frequency subband from the channel covariance matrix;

compute a spatial projection of the uplink beamforming weights;

compute a downlink spatial projection for a given frequency subband from the spatial projection of the uplink beamforming weights; and compute downlink beamforming weights from the downlink spatial projection, wherein the downlink beamforming weights are for use by the first communication device when beamforming a downlink transmission via the plurality of antennas of the first communication device to the second communication device.

22. The apparatus of claim 21, wherein the controller is further configured to compute frequency domain variations in the channel between the first communication device and the second communication device based on difference in time of arrival of signals from different direction of arrivals at the plurality of antennas of the first communication device, and to compute the downlink spatial projection for a given frequency subband based on the spatial projection of the uplink beamforming weights and the frequency domain variations.

23. One or more tangible memory media storing processor readable instructions that, when executed by a processor, are operable to:

store data representing reception of a transmission sent by a second communication device and received at a plurality of antennas of a first communication device, wherein the transmission uses some but not all frequency subbands within a frequency band space and wherein the data represents baseband signals carried in the frequency subbands of the received transmission;

compute a channel covariance matrix from data representing the baseband signals in the frequency subbands with respect to the plurality of antennas of the first communication device;

compute uplink beamforming weights from the baseband signals in the frequency subband from the channel covariance matrix;

compute a spatial projection of the uplink beamforming weights;

compute a downlink spatial projection for a given frequency subband from the frequency domain variations and the spatial projection of the uplink beamforming weights; and compute downlink beamforming weights from the downlink spatial projection, wherein the downlink beamforming weights are for use by the first communication device when beamforming a downlink transmission via the plurality of antennas of the first communication device to the second communication device.

24. The tangible memory media of claim 23, and further comprising instructions, that when executed by the processor, are operable to compute frequency domain variations in the channel between the first communication device and the second communication device based on difference in time of arrival of signals from different direction of arrivals at the plurality of antennas of the first communication device, and wherein the instructions operable to compute the downlink spatial projection for a given frequency subband comprise instructions operable to compute the downlink spatial projection based on the spatial projection of the uplink beamforming weights and the frequency domain variations.

25. The apparatus of claim 21, wherein the transmission from the second communication device comprises a plurality of subcarriers at different frequencies in each of a plurality of tiles, and wherein the controller is configured to compute the channel covariance matrix by computing J instantaneous channel covariance matrices in the frequency domain as a group of matrices $\{R_{i_n}\}_{n=1}^J$, where J is the number of tiles, $i_1, i_2, \ldots, i_J$ are the index of baseband signals for subcarriers in J tiles respectively, and wherein the controller to compute the uplink beamforming weights by computing a group of beamforming weights vectors $\{W_{i_n}\}_{n=1}^J$ for the J tiles.

26. The apparatus of claim 25, wherein the controller is configured to compute the uplink beamforming weights based on columns of the channel covariance matrices.

27. The apparatus of claim 25, wherein the controller is configured to compute the uplink beamforming weights based on rows of the channel covariance matrices.

28. The tangible memory media of claim 23, wherein the transmission from the second communication device comprises a plurality of subcarriers at different frequencies in each of a plurality of tiles, and wherein the instructions that cause the processor to compute the channel covariance matrix comprise instructions that cause the processor to compute J instantaneous channel covariance matrices in the frequency domain as a group of matrices $\{R_{i_n}\}_{n=1}^J$, where J is the number of tiles, $i_1, i_2, \ldots, i_J$ are the index of baseband signals for subcarriers in J tiles respectively, and the instructions that cause the processor to compute the uplink beamforming weights comprise instructions that cause the processor to compute a group of beamforming weights vectors $\{W_{i_n}\}_{n=1}^J$ for the J tiles.

29. The tangible memory media of claim 28, wherein the instructions that cause the processor to compute the uplink beamforming weights comprise instructions that are operable to compute the uplink beamforming weights based on columns of the channel covariance matrices.

30. The tangible memory media of claim 28, wherein the instructions that cause the processor to compute the uplink beamforming weights comprise instructions that are operable to compute the uplink beamforming weights based on rows of the channel covariance matrices.

* * * * *